Aug. 4, 1970     L. KIRSTEIN ET AL     3,522,981
FOCUSING CONTROL FOR MOTION-PICTURE OR TELEVISION CAMERA
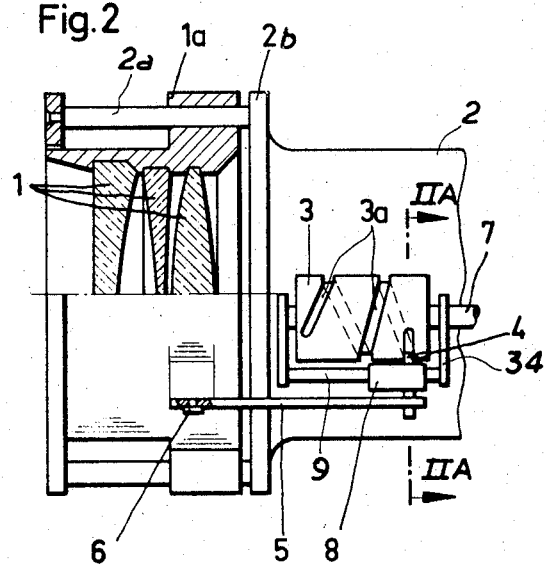
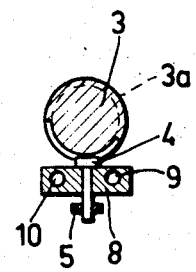
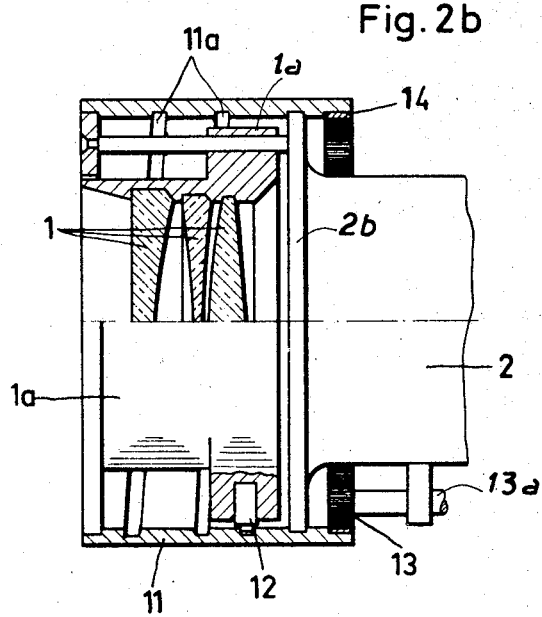
Lothar Kirstein
Klaus-Udo Teubner
Inventors

United States Patent Office 3,522,981
Patented Aug. 4, 1970

3,522,981
FOCUSING CONTROL FOR MOTION-PICTURE OR TELEVISION CAMERA
Lothar Kirstein and Klaus-Udo Teubner, Bad Kreuznach, Germany, assignors to Jos. Schneider & Co., Optische Werke Kreuznach, Bad Kreuznach, Rhineland, Germany, a corporation of Germany
Filed Oct. 15, 1968, Ser. No. 767,620
Claims priority, application Germany, Oct. 17, 1967, 1,597,417
Int. Cl. G02b 7/04, 15/00
U.S. Cl. 350—44      1 Claim

ABSTRACT OF THE DISCLOSURE

To linearize the focusing action of a motion-picture or television camera during the tracking of objects moving toward or away from the camera, a nonlinear transmission is so interposed between an axially slidable lens support and a rotatable actuator therefor as to translate a given rate of rotation of the actuator into a relatively slow displacement of the lens support during focusing upon remote objects and into a relatively fast displacement of that support during close-ups.

---

Our present invention relates to a picture-taking camera, particularly for motion-picture or television purposes, having an objective which is focusable over a wide range (generally from infinity to close-up) by an axial displacement of some or all of its lenses.

In conventional photographic, cinematographic or television cameras such focusing takes place under the control of a rotatable actuator, e.g. a worm shaft, whose manual or automatic rotation between two limiting positions is linearly translated into a corresponding shift of the axially displaceable optical component.

During the filming or televiewing of objects moving toward or away from the camera at substantially constant speed, e.g. in visually tracking an incoming or departing vehicle, the laws of optics require a shifting of the focusing component at a progressively varying rate, this rate increasing during transition from long-range to short-range focusing; the change in the rate of lens movement is due to the well-known relationship between the object distance $z$ and the image distance $z'$ (measured from the primary and the secondary focus, respectively, of the objective), this relationship being given by the expression:

$$z = -f^2/z'$$

where $f$ is the focal length of the objective. Thus, if the the object distance $z$ changes linearly with time, the image distance $z'$ varies according to a hyperbolic law. As a result, the actuator of the focusing mechanism must be rotated more rapidly at close range than at long distance to keep the objective trained upon an object moving at a given radial speed.

Our invention, accordingly, aims at providing means in such camera for enabling the visual tracking of radially moving objects, over an extended range of adjustment, by a controlling motion which is generally proportional to the displacement of an object to be tracked, i.e. which is substantially linear if the object moves at a constant rate.

The above aim is realized, pursuant to our present invention, by the provision of coupling means with a nonlinear transmission ratio between an axially shiftable support for the focusing component of the objective and a preferably rotatable actuating element therefor, this transmission ratio converting a given rate of movement of the actuating element into a displacement of the focusing component at a rate accelerating upon movement of the actuating element from one limiting position, i.e. the position corresponding to long-range focusing, toward its other limiting position corresponding to short-range focusing.

Such a nonlinear transmission ratio can be obtained with the aid of a generally helicoidal camming formation (e.g. a ridge or a groove) of varying pitch which may be provided on the inner periphery of a lens barrel centered on the objective axis or on a cylinder disposed alongside the objective parallel to that axis. It is also possible to use, for this purpose, a drive screw whose shaft constitutes the rotatable actuating element and which coacts with a nut or with a pinion or worm gear to displace the shiftable support for the focusing component through the intermediary of an articulated linkage.

The invention will be described in greater detail with reference to the accompanying drawing in which:

FIG. 2 is a side-elevational view, partly in section, of the front portion of a camera equiped with a focusing mechanism according to the invention;

FIG. 2a is a cross-sectional detail view taken on the line IIA–IIA of FIG. 2;

FIG. 2b is a view similar to FIG. 2, illustrating a modification; and

Figure 1:
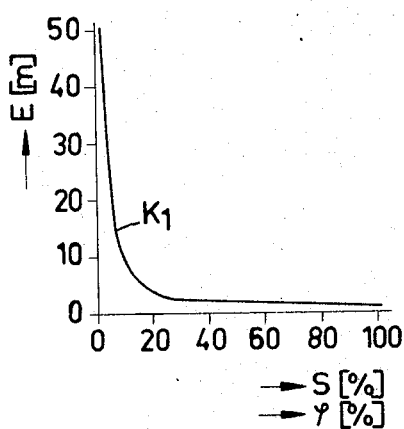
FIG. 1 is a graph showing the object distance of a camera objective as a function of the position of a shiftable focusing component with reference to a fixed image plane, such as the plane of a motion-picture film or of a photocathode.

In FIG. 1 we have shown a curve $K_1$ representing the object distance E, in meters, as a function of the displacement $s$, in percent of a stroke length, between a first limiting position 0 (corresponding to focusing at infinity) and a second limiting position 100 (close-up) in a conventional system, the percentage values plotted on the abscissa also applying to the angle of rotation $\varphi$ on an associated control element which is linearly coupled with the displaceable optical component.

Figure 1A:
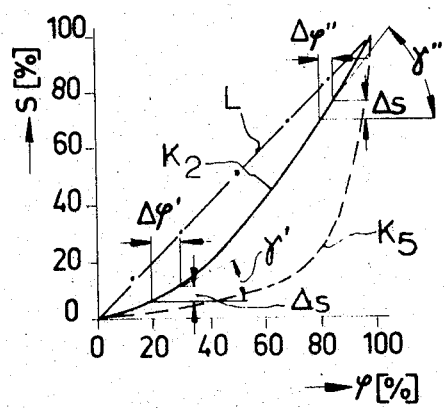
FIG. 1a is a graph illustrating the relationship between the movement of an actuating element and the displacement of a focusing component in a system according to the invention.
Figure 1B:
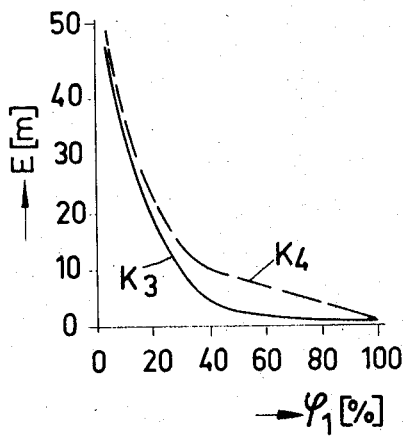
FIG. 1b is a graph similar to FIG. 1, showing the object distance as a function of the position of the actuating element in a system according to the invention.

The curve $K_2$ of FIG. 1a illustrates the effect of non-linear coupling, according to our present invention, between the shiftable component and its actuating element, the angle $\varphi$ being plotted again in percent along the abscissa while the axial displacement $s$ (also in percent) appears along the ordinate. the slope of curve $K_2$, representing $s$ as a function of $\varphi$, grows progressively from $\varphi = 0$ to $\varphi = 100$. Thus, in the distal range of adjustment represented by the lower valves of $\varphi$, a tangent to curve $K_2$ includes with the abscissa a relatively small angle $\gamma'$ given by the expression:

$$\tan \gamma' = \Delta s / \Delta \varphi'$$

whereas in the proximal range of adjustment represented by the larger values of $\varphi$ there exists a relatively large angle $\gamma''$ given by the expression:

$$\tan \gamma'' = \Delta s / \Delta \varphi''$$

with $\Delta \varphi' > \Delta \varphi''$. The result of this nonlinear relationship between $\varphi$ and $s$ is reflected by curve $K_3$ of FIG. 1b whose slope is more nearly constant than that of curve $K_1$ of FIG. 1 over a range approaching the camera to within a few meters. For comparison, a straight line L (dot-dashed) in FIG. 1a represents the conventional linear relationship between $\varphi$ and $s$.

By modifying the shape of curve $K_2$ in FIG. 1a it is possible to convert the hyperbolical curve $K_1$ of FIG. 1 into a curve $K_4$ (dotted lines, FIG. 1b) with a substantially constant slope for near-infinity to some intermediate point, here a distance of about 10 meters, and substantially constant but lesser slope from that intermediate point to a close-up distance on the order of the focal length of the objective. This has the advantage that focusing, which becomes more critical at close range, can be carried out more accurately when tracking objects at short distance. The modified function $s(\varphi)$ is represented by a curve $K_5$ (dotted, FIG. 1a) which, like curve $K_2$, has a positive increment of slope $(d^2s/d\varphi^2 > 0)$ for all values between $s=\varphi=0$ and $s=\varphi=100$.

FIGS. 2 and 2a show part of a camera having means for enabling substantially linear focusing with the aid of a nonlinear coupling between one or more shiftable lenses and a rotatable actuating element. Within the housing of an otherwise conventional camera, not further illustrated, there is disposed a stationary lens barrel 2 which may contain one or more fixed lenses preceded by a movable front group 1 within a lens mount 1a, the latter being axially slidable on guider rods 2a projecting forwardly from a peripheral flange 2b of barrel 2. An actuating element in the form of a rotatable shaft 7, parallel to the optical axis of the objective and journaled in a frame 34 rigid with lens barrel 3, supports a cylinder 3 provided with a generally helicoidal peripheral groove 3a whose pitch increases from right to left as viewed in FIG. 2 and which is engaged by a follower 4 in the form of a pin on a slider 8 carried by frame 34. Slider 8 is coupled with lens mount 1a via an arm 5 secured to the lens mount by a screw 6; as best seen in FIG. 2a, slider 8 rides on two parallel rails 9, 10 forming part of the frame 34.

In the limiting position illustrated in FIG. 2, component 1 is closest to the image plane of the system (not shown) with the objective focused on infinity. Upon counterclockwise rotation (as viewed in FIG. 2a) of shaft 7 and cylinder 3 by hand or by a drive motor (not shown) at substantially constant speed, component 1 moves toward the left (FIG. 2) at a progressively faster rate so as to establish a law of motion similar to that represented by the curve $K_2$ in FIG. 1a.

According to FIG. 2b, the cylinder 3 has been replaced by a tubular extension 11 of lens barrel 2 rotatable relatively thereto on its flange 2b; a camming groove 11a on the inner peripheral surface of the tube 11, replacing groove 2a of the preceding embodiment, is engaged by a follower 12 on lens mount 1a and varies in pitch in the aforedescribed manner so that uniform rotation of tube 11 about the objective axis results in a progresive speed change of component 1. Such rotation is brought by a pinion 13 meshing with a ring of gear teeth 14 on the inner periphery of tube 11, pinion 13 being secured to a shaft 13a representing the rotatable actuation element.

In order to produce the law of motion described above with reference to curve $K_4$ of FIG. 1b, it will evidently be necessary to divide the curve 3a of FIG. 2 (or the curve 11a of FIG. 2b) into a first section of nearly constant, relatively low pitch angle and a second section of nearly constant, relatively high pitch angle separated by a transition zone in the region of the bend (at the 10-meter point) of curve $K_4$, as described above with reference to FIG. 1a.

Figure 3:
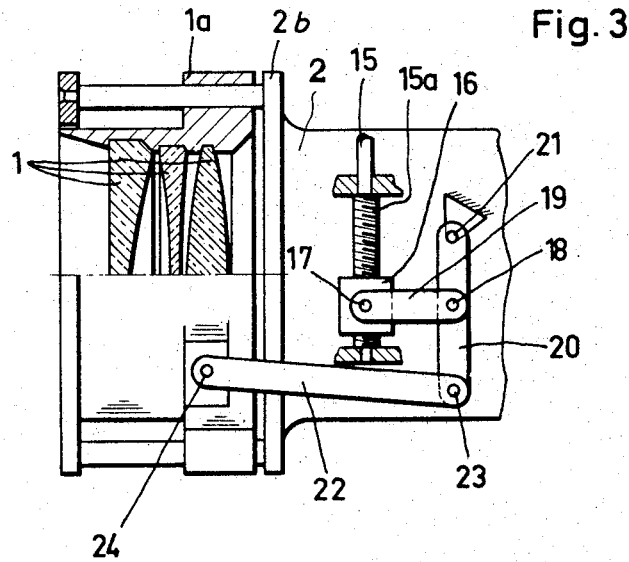
FIGS. 3 and 4 are two further views similar to FIG. 2, showing two other embodiments.

FIG. 3 shows another system according to the invention in which the actuating element is a rotatable shaft 15 lying skew to the objective axis, this shaft being journaled externally on lens barrel 2 and being rigid with a lead screw 15a engaged by an axially movable nut 16. An arm 19, articulated at 17 to nut 16 and at 18 to a lever 20, translates a linear displacement of nut 17 into a nonlinear shift of lens mount 1a as previously described, the free end of lever 20 being linked in with this lens mount via a pitman 22 and joints 23, 24. Lever 20 has a fixed fulcrum 21 offset from the axis of shaft 15 and screw 15a. In the illustrated position of the lead-screw follower or nut 16, in which lever 20 lies substantially parallel to shaft 15, the system is focused on infinity; upon progressive upward movement of nut 16, lever 20 swings clockwise at an accelerated rate with commensurate leftward displacement of lens group 1.

Figure 4:
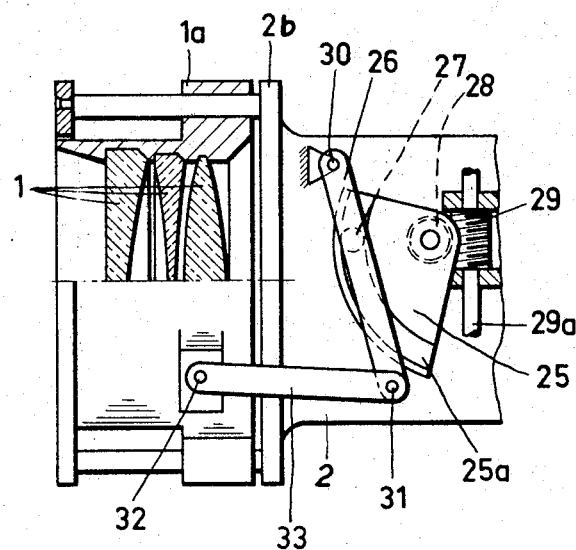

In FIG. 4 the displaceable actuating element is a shaft 29a, lying again skew to the optical axis of the system, which is rigid with a worm-type screw 29 engaging a pinion or worm wheel 28 acting as a lead-screw follower. A sector 25 fastened to worm wheel 28 has a camming formation in the shape of an arcuate groove 25a which is eccentric with reference to the axis of the worm wheel 28. A lever 26, having a fixed fulcrum 30 offset from the axis of shaft 29a, engages with a stud 27 in camming curve 25 and is articulated at 31 to a pitman 33 whose other end is similarly journaled at 32 to the lens mount 1a. Owing to the increasing radius of curve 25a as measured from the swing axis of sector 25, a constant rotation of worm 29 to rotate the sector in a clockwise sense will again result in a progressively accelerated leftward displacement of lens group 1 from the illustrated starting position corresponding to focusing at infinity.

Although the system according to our invention has particular utility in cinematographic and television cameras, it can also be employed in ordinary photographic cameras, e.g. for the taking of a series of still pictures in successive positions of a radially moving object.

We claim:

1. In a camera provided with an objective including an axially displaceable optical component for focusing upon objects located at different distances from the camera, the combination therewith of an axially shiftable support for said component, a movable actuating element, a lead screw disposed substantially transversely to the objective axis and coupled with said element for rotation thereof, a pinion meshing with said lead screw, and an articulated linkage operatively connecting said pinion with said support for displacing the latter from a long-range focusing position into a short-range focusing position at an accelerating speed ratio with reference to the movement of said actuating element; said articulated linkage comprising a lever generally parallel to said lead screw with a free first end and with a second end fixedly fulcrumed at a location offset from the axis of said lead screw, a pitman substantially parallel to said axis articulated to said free first end and pivoted to said support, a carrier rigid with said pinion having an arcuate camming formation eccentrically disposed with reference to the pinion axis, and a projection on an intermediate point of said lever engaging said camming formation, said formation following a curve of progressively varying radius.

References Cited

UNITED STATES PATENTS

| 2,055,235 | 9/1936  | Klatt      | 355—58  |
| 2,532,684 | 12/1950 | Walker     | 350—187 |
| 2,693,736 | 11/1954 | Schumacher | 355—58  |
| 3,116,359 | 12/1963 | Solisch    | 355—255 |
| 3,134,298 | 5/1964  | Volkholz   | 350—255 |
| 3,185,029 | 5/1965  | Peck et al.| 350—187 |

PAUL R. GILLIAM, Primary Examiner

U.S. Cl. X.R.

95—45; 350—187